US011118032B2

(12) United States Patent
Zicker

(10) Patent No.: US 11,118,032 B2
(45) Date of Patent: Sep. 14, 2021

(54) STARCH BASED DILATANT COMPOSITION

(71) Applicant: William Zicker, Forest Hill, MD (US)

(72) Inventor: William Zicker, Forest Hill, MD (US)

(*) Notice: Subject to any disclaimer, the term of this patent is extended or adjusted under 35 U.S.C. 154(b) by 434 days.

(21) Appl. No.: 15/998,279

(22) Filed: Jul. 30, 2018

(65) Prior Publication Data
US 2019/0136017 A1 May 9, 2019

Related U.S. Application Data

(63) Continuation of application No. 14/382,611, filed as application No. PCT/US2013/036507 on Apr. 13, 2013, now abandoned.

(60) Provisional application No. 61/636,628, filed on Apr. 21, 2012.

(51) Int. Cl.
C08L 3/00 (2006.01)
C08L 3/02 (2006.01)
C08B 30/14 (2006.01)
C08L 3/12 (2006.01)
C08K 3/16 (2006.01)
C08K 3/26 (2006.01)
C08K 3/38 (2006.01)
C08K 5/05 (2006.01)
C08K 5/053 (2006.01)
C08L 83/04 (2006.01)
C09J 103/02 (2006.01)
C09J 103/12 (2006.01)
B44C 3/04 (2006.01)
C08L 91/00 (2006.01)

(52) U.S. Cl.
CPC ............... *C08L 3/02* (2013.01); *C08B 30/14* (2013.01); *C08K 3/16* (2013.01); *C08K 3/26* (2013.01); *C08K 3/38* (2013.01); *C08K 5/05* (2013.01); *C08K 5/053* (2013.01); *C08L 3/12* (2013.01); *C08L 83/04* (2013.01); *C09J 103/02* (2013.01); *C09J 103/12* (2013.01); *B44C 3/04* (2013.01); *C08L 91/00* (2013.01)

(58) Field of Classification Search
None
See application file for complete search history.

(56) References Cited

U.S. PATENT DOCUMENTS

| 4,465,702 A * | 8/1984 | Eastman | A23L 29/212 127/32 |
| 5,676,994 A * | 10/1997 | Eskins | A21D 2/16 426/602 |
| 2003/0084818 A1* | 5/2003 | Pelley | C09J 103/06 106/206.1 |
| 2003/0201103 A1* | 10/2003 | Brookey | C09K 8/50 166/283 |
| 2014/0008019 A1* | 1/2014 | Van Delden | C09J 11/06 156/311 |

FOREIGN PATENT DOCUMENTS

EP 0576221 A2 * 12/1993 ............ C09J 103/02

OTHER PUBLICATIONS

Daniel et al, starch, wiley-VCH Verlag GmbH and Co. KaA, Weinheim (Year: 2005).*

* cited by examiner

Primary Examiner — Stefanie J Cohen
(74) Attorney, Agent, or Firm — Royal W. Craig; Gordon Feinblatt LLC

(57) ABSTRACT

There is provided a novel a non-toxic self-adhesive shear thickening dilatant fluid and process for the formation thereof comprising the sequential steps of forming a gel comprising a first portion of starch and water and adding a sufficient second portion of dry non-toxic solid material to said gel to form a kneadable solid which is dry to the touch. In particular it is directed to a material whose base is corn starch.

18 Claims, No Drawings

STARCH BASED DILATANT COMPOSITION

This application is a continuation of applicant's application Ser. No. 14/382,611 filed Sep. 3, 2014, now abandoned, and claims the priority thereof and the PCT application WO 2013/158510 upon which it is based and claims the priority thereof.

FIELD OF THE INVENTION

Non toxic dilatant compositions based on starch which may be molded formed and reformed and remain workable for a substantial period of time.

BACKGROUND OF THE INVENTION

Dilatant compositions made with uncooked finely divided starch suspended in water are well known. They are often used to demonstrate shear thickening. Their disadvantages are also well known. Principally once uncooked starch is put into suspension it immediately begins to settle out of suspension. Furthermore once the material is exposed to air it rapidly dries out and can no longer be used. Starch, uncooked, mixed with water yields a material that is either crumbly or runny. While it may be dilatant, it is not well suited to being molded.

Over the years many attempts have been made to overcome some of these problems but none solve all of the problems associated with them.

While there are a number of more stable shear thickening compositions, many require unusual or synthetic materials. Starch based shear thickening materials provide plant based non toxic compositions. There is a need for a more stable starch based material that demonstrates shear thickening.

Materials useful for the purposes of the present invention have been in the market for many years. Silicone putty (Silly Putty®) is made of silicone oil, it is a dilatant, but can NOT be formed and dried, is relatively expensive and tends to stain objects it contacts, it is NOT biodegradable, lasts long after it gets dirty, and can NOT be cleaned.

Play doughs (like Play Doh®) are made of wheat (gluten) and/or starch but are not dilatant. They can be formed and dried and are relatively inexpensive. They tend to be messy, and are usually biodegradable. They last long after they get dirty, and cannot be cleaned.

The product produced by the process of the present invention is made of starch, is dilatant and can be formed and dried. It is kneadable, relatively inexpensive, very easy to clean up, and is biodegradable. After use it eventually changes to liquid, becomes crumbly and can be discarded as it gets dirty. It is not understood why the addition of a dry uncooked starch to a gel initially formed from water and starch, suitably, but not limited to dry starch, gives rise to such a product.

The product is significantly more stable than a suspension of uncooked finely divided starch in a liquid medium such as water. After repeated squeezing beyond the kneading of production, the product will begin to break down. While the specific mechanism causing this is not well understood, this appears to take the form of water being released from the starch gel. Separately, if exposed to the air, water will evaporate and the material will dry and become solid.

After the material becomes more fluid it is still fun to play with, though somewhat more messy. As the material is used, it naturally collects dust and dirt, as well as other residues from hands or surfaces in contact with the material. Eventually it is discarded, and is biodegradable.

DISCUSSION OF THE PRIOR ART

U.S. Pat. No. 3,167,440 discloses a pliable craft modeling composition made of starch (as "wheat flour") in water, and including salt and borax.

U.S. Pat. No. 4,375,535 discloses using high amylopectin starch in a chemically modified composition to make an aqueous dispersion that does not thicken. This document appears to provide some relevant details of the physical and chemical behavior of amylopectin in various chemical media and conditions.

U.S. Pat. No. 5,362,777 discloses a "thermo plastically processable starch" in which a gum (i.e. polysaccharide) involving saccharide units is used in addition to an already dispersed starch in an aqueous solution. Products made with this composition include extruded tubes.

U.S. Pat. No. 5,614,243 discloses a food formulation including pregelatinized starch and an insoluble ingredient (e.g., $TiO_2$), in order to provide a texturized product.

U.S. Pat. No. 6,713,624 discloses a starch-based modeling compound including a starch-based binder and 2-10% of a "retrogradation inhibitor," such as a waxy corn starch. The invention of the present application is distinguishable from Hasbro patent U.S. Pat. No. 6,713,624 both in that the present invention has a suspended uncooked starch component, and exhibits shear thickening properties.

U.S. Pat. No. 6,713,624 patent material lacks a suspended uncooked starch component, and exhibits shear thinning properties like many play doughs.

U.S. Pat. No. 7,861,637 discloses a "pressure impulse mitigation" structure, e.g., a body armor, including a gel with additional ingredients. This document broadly covers the use of nearly any dilatant gel composition including a wide range of additional ingredients that may act as particulate matter in the gel. Also, see column 3, lines 22-25 in which the gel can be a polysaccharide, and an additional "thickener" can be starch, see column 4, lines 27-2.

This invention relates to a plastic modeling composition of a soft pliable, working consistency for being molded into any desired shape or form and is slow-drying so as to be retained in a workable moldable condition for a long period of time to be repeatedly reworked and molded into different shapes and forms. It particularly pertains to a modeling composition for children's play, and is clean, non-sticky and non-staining

SUMMARY OF THE INVENTION

One of the main objects of the invention is a modeling composition which may be reworked and remolded, or may be used for modeling objects which are more or less permanent. Another object of the invention is a modeling composition which is easily compounded and another object of the invention is a modeling composition which is efficient in use.

Another object of the invention is a modeling composition which is non-toxic.

Another object of the invention is a modeling composition in which additives such as colorants, texturants, odorants, flavorants and the like different colors may be incorporated. However care should be taken that the quantity of such additives do not affect its moldable consistency or shelf life.

The compositions may be molded into objects adapted to be painted with conventional water and oil based paints Further objects, and objects relating to details of construction and composition, will readily appear from the detailed description to follow. The objects of the invention have been accomplished by the means set forth in the following specification. The invention is clearly defined and pointed out in the appended claims; example compositions are also set forth for carrying out the invention. Generally described the invention comprises a composition consisting essentially of vegetable flour, such as grain flour which is adapted to be gelatinized and water only although other ingredients may be added as will appear below.

There is provided a process for the formation of an adhesive shear thickening dilatant fluid comprising adding to a starch gel, a sufficient portion of dry non toxic solid material to form a kneadable solid.

Suitably there is provided a process for the formation of an adhesive shear thickening dilatant fluid comprising adding to a starch gel, a sufficient portion of uncooked starch to form a kneadable solid. In such a process it has been found suitable to use an aqueous based starch gel and as the added starch dry uncooked starch. Any starch may be used for this purpose including but not limited to wheat starch, potato starch, rice starch and tapioca starch. However it is preferred to use corn starch most suitably waxy corn starch containing high levels of amylopectin, most desirably at least 90% by weight of amylopectin.

Any starch gel prepared by any method may be used. Commercially available starch gels are generally satisfactory. The gels may be prepared by methods well known in the art either in ambient temperature solvents or heated solvents generally water, but not limited thereto.

One embodiment of the of the present invention is the provision of a shear thickening dilatant fluid and a process for the formation thereof comprising the sequential steps of forming a gel comprising a first portion of starch and water and adding a sufficient second portion of a dry non toxic solid material, suitably a dry starch to said gel to form a kneadable solid which is dry to the touch.

Suitably, the second portion of solid material is corn starch although other very finely divided materials may also be viable.

Suitably the process comprises swelling said first portion of starch in water to a temperature sufficient to form said gel, allowing the said thus formed gel to cool to ambient temperature, mixing said second portion of starch with said gel and applying sufficient pressure to said mixture to form a kneadable solid.

The nature of the starch is not critical, however it has been found useful to utilize corn starch, preferably waxy maize starch which is principally amylopectin most suitably containing at least 90% preferably 99% by weight of amylopectin, as the starch. The use of high or pure amylopectin and the absence of amylose enhances the shelf life of the product.

DESCRIPTION OF THE PREFERRED EMBODIMENTS

Where a pregelatinized or cold water swelling starch is used as the first starch it will form a gel at ambient temperatures. No substantial amount of heating such as boiling is needed It is desirable that the process comprises combining at least three parts by weight of starch with each 100 parts by weight of water to form a gel and adding to each 100 parts by weight of gel from about 50 to about 150 parts by weight of dry uncooked starch. In particular there should be employed 5 to 10 parts by weight of starch with each 100 parts by weight of water to form the gel and adding to each 100 parts by weight of gel, from about 67 to about 133 parts by weight of dry starch.

Most suitably, there are combined 5 to 10 parts by weight of starch with each 100 parts by weight of water to form the gel and there are added to each 100 parts by weight of gel from about 60 to about 80 parts by weight of dry starch.

There may be added other components to improve the quality of the final product. These qualities include strength, flexibility, non-stickiness, stretchability and shelf life.

The quality of the dilatant fluid produced by this process may be enhanced by the use of one or more additive materials selected from the group consisting of a humectant, such as glycerin, a lipid, suitably a low acid oil, such as canola oil, a non toxic salt, suitably a salt of a strong acid such as sodium or potassium chloride and the like and borax said additive material being a component of at least one member of the group consisting of the starch gel and the added starch. The designation of such additives is merely illustrative and not limiting.

The best shelf life is provided by the use of amylopectin as both of the starch components. Use of amylopectin in an air tight container will provide a shelf life of several months or more. Addition of a humectant, including but not limited to glycerin, provides an extended usable time outside of a sealed container.

The addition of antimicrobial agents is also helpful. These need not be of a complex or sophisticated nature. Most non toxic salts of strong bases and strong acids will be adequate. Common salt or sodium chloride may be readily employed.

In order to improve the stretchability of the final product, borax has been found useful. The addition of lipids or vegetable oils, suitably low acid vegetable oils such as canola oil is useful to improve the smoothness of the product and is helpful in avoidance of the product sticking to the hands.

Any or all of these quality enhancing components may be used. The amounts employed will vary with the nature and quantities of the starch used in the basic material and the effect desired. There is no absolute limitation as to the amount of such components which can be added. Nevertheless it has been found useful to limit the total weight of these additional components to about 15% by weight of the final product containing them.

EXAMPLES

Example 1

Very fluid material, unstable due to syneresis within two weeks.
Wet Component:

| | |
|---|---|
| Water | 200 g |
| Cornstarch (not modified, about 25% amylose, 75% amylopectin) | 10 g |
| emulsifying wax flakes (polysorbate 60 & cetearyl alcohol) | 2 g |
| dimethicone (polymethylsiloxane) | 1 g |

Dry Component

| | |
|---|---|
| Cornstarch (not modified, about 25% amylose, 75% amylopectin) | 250 g |
| Baking Soda | 260 g |

Wet component ingredients were combined and heated to 100° C. while stirring gently. After the liquid thickened, it was removed from the heat source and allowed to cool to room temperature. Thereafter the dry ingredients were added and stirred gently to combine.

Example 2

Very fluid material, unstable due to syneresis within two weeks.

Wet Component:

| | |
|---|---|
| Water | 100 g |
| Tapioca Starch | 5 g |
| Psyllium Hydrophilic Mucilloid powder | 5 g |

Dry Component

| | |
|---|---|
| Cornstarch (not modified, about 25% amylose, 75% amylopectin) | 37 g |
| Borax | 4 g |

Wet component ingredients were combined and heated to 100° C. while stirring gently. After the liquid thickened, it was removed from the heat source and allowed to cool to room temperature. Thereafter the dry ingredients were added and stirred gently to combine

Example 3

Reasonably good putty, unstable due to syneresis within two weeks.

Wet Component:

| | |
|---|---|
| Water | 100 g |
| Tapioca starch | 5 g |

Dry Component

| | |
|---|---|
| Cornstarch (not modified, about 25% amylose, 75% amylopectin) | 57 g |
| Borax | 4 g |

Wet component ingredients were combined and heated to 100° C. while stirring gently. After the liquid thickened, it was removed from the heat source and allowed to cool to room temperature. Thereafter the dry ingredients were added and stirred gently to combine

Example 4

Reasonably good putty, unstable due to syneresis within two weeks.

Wet Component:

| | |
|---|---|
| Water | 400 g |
| Cornstarch (not modified, about 25% amylose, 75% amylopectin) | 36 g |
| Borax | 9 g |
| NaCl salt | 4 g |

Dry Component

| | |
|---|---|
| Cornstarch (not modified, about 25% amylose, 75% amylopectin) | 250 g |
| Palm Oil | 15 g |

Wet component ingredients were combined and heated to 100° C. while stirring gently. After the liquid thickened, it was removed from the heat source and allowed to cool to room temperature. Thereafter the dry ingredients were added and stirred and kneaded to combine.

Example 5

Not as soft or stretchy as desired, unstable due to syneresis within two weeks.

Wet Component:

| | |
|---|---|
| Water | 50 g |
| Wheat flour | 7 g |
| Borax | 9 g |

Dry Component

| | |
|---|---|
| Cornstarch (not modified, about 25% amylose, 75% amylopectin) | 30 g |

Wet component ingredients were combined and heated to 100° C. while stirring gently. After the liquid thickened, it was removed from the heat source and allowed to cool to room temperature. Thereafter the dry ingredients were added and stirred and kneaded to combine.

Example 6

Good shelf life, good material qualities, requires cooking.

Wet Component:

| | |
|---|---|
| Water | 186 g |
| ThermFlo modified corn starch, 99% Amylopectin, mfg by Ingredion | 21 g |
| Borax | 12 g |
| NaCl Salt | 18 g |

Dry Component

| | |
|---|---|
| ThermFlo modified corn starch, 99% Amylopectin, mfg by Ingredion | 135 g |
| Canola oil | 16 g |

Wet component ingredients were combined and heated to 100° C. while stirring gently. After the liquid thickened, it was removed from the heat source and allowed to cool to room temperature. Thereafter the dry ingredients were added and stirred and kneaded to combine.

Example 7

Excellent shelf life, excellent material qualities, no cooking required.

Wet Component:

| | |
|---|---|
| Water (warm) | 1260 g |
| UltraTex SR, cold water swelling modified corn starch, 99% Amylopectin, mfg by Ingredion | 162 g |
| Borax | 72 g |
| NaCl salt | 108 g |
| Glycerin | 120 g |

Dry Component

| | |
|---|---|
| ThermTex modified corn starch, 99% Amylopectin, mfg by Ingredion | 930 g |
| Canola Oil | 90 g |
| Glycerin | 40 g |

Combine wet components and allow setting as a gel, adding dry component stirring gently, and then kneading mixture, stopping when material becomes smooth and forms a cohesive mass.

Glycerin acts as a humectant delaying drying out. Borax increases cross linking of starch gel, and thus material stability. Salt contributes to antimicrobial property. Canola is a low acid oil that reduces stickiness without damaging starch gel stability.

Example 8

Cornstarch and water only ingredients, lasts only minutes before drying out. Material that results is not shelf stable due to retrogradation of the starch gel.
Wet Component:

| | |
|---|---|
| Water | 418 g |
| Cornstarch (not modified, about 25% amylose, 75% amylopectin) | 22 g |

Dry Component

| | |
|---|---|
| Cornstarch (not modified, about 25% amylose, 75% amylopectin) | 560 g |

Wet component ingredients were combined and heated to 100° C. while stirring gently. After the liquid thickened, it was removed from the heat source and allowed to cool to room temperature. Thereafter the dry ingredients were added and stirred and kneaded to combine.

Example 9

Material is stable, but prone to drying out easily.
Wet Component:

| | |
|---|---|
| Water | 418 g |
| UltraTex SR (Ingredion) cold water swelling waxy maize modified food starch (99%+ Amylopectin) | 22 g |

Dry Component

| | |
|---|---|
| ThermTex (Ingredion) uncooked waxy maize modified food starch (99%+ Amylopectin) | 560 g |

Modified cornstarch and water are the only ingredients, cooking not required. The wet components were combined and allowed to set as a gel, dry component added while stirring gently, then the mixture was kneaded, stopping when material become smooth and formed a cohesive mass Example 10

Material that results is not shelf stable due to retrogradation of the starch gel. Cornstarch and water are the only ingredients. The material lasts only minutes before drying out.
Wet Component:

| | |
|---|---|
| Water | 418 g |
| Cornstarch (not modified, about 25% amylose, 75% amylopectin) | 22 g |

Dry Component

| | |
|---|---|
| 56% ThermTex (Ingredion) uncooked waxy maize modified food starch (99%+ Amylopectin) | 560 g |

Wet component ingredients were combined and heated to 100° C. while stirring gently, after the liquid thickened, it was removed from the heat source and allowed to cool to room temperature. Thereafter the dry ingredients were added and stirred and kneaded to combine.

Example 11

Very stable material results.
Wet Component:

| | |
|---|---|
| Water | 4529 g |
| Borax, finely divided solid | 259 g |
| NaCl salt, finely divided solid | 388 g |
| Glycerin | 431 g |
| UltraTex SR (Ingredion) cold water swelling waxy maize modified food starch (99%+ Amylopectin) | 582 g |

Dry Component

| | |
|---|---|
| ThermTex (Ingredion) uncooked waxy maize modified food starch | 3343 g |
| Canola | 324 g |
| Glycerin | 144 g |

Wet components were mixed with water at ambient The wet components were combined stirred and allowed to set as a gel in about 10 minutes, dry component added while stirring gently, then the mixture was kneaded, stopping when material become smooth and formed a cohesive mass Glycerin acts as a humectant, delaying drying out. Borax increases cross linking of starch gel, and thus material stability. Salt contributes to antimicrobial property. Canola is a low acid oil that reduces stickiness without damaging starch gel stability.

Example 12

High-quality material results. Stability highly variable, and limited by type of starch used in gel.

Wet Component:

| | |
|---|---|
| Water | 4529 g |
| Borax, finely divided solid | 259 g |
| NaCl salt, finely divided solid | 388 g |
| Glycerin | 431 g |
| Starch: any type of starch, or any combination of modified or unmodified starches (Rice, Potato, Tapioca, Corn, etc.) | 582 g |

Dry Component

| | |
|---|---|
| Starch: any type of starch, or any combination of modified or unmodified starches (Rice, Potato, Tapioca, Corn, etc.) | 3343 g |
| Canola | 324 g |
| Glycerin | 144 g |

All wet non starch components are mixed into water heated to 37° C. Mix in starch, stirring slowly, cook if required to form gel, heating to about 100° C. depending on starch type as starch begins to gel, allow setting for 10 minutes. Then add dry components stirring gently, knead mixture, stopping when material becomes smooth and forms a cohesive mass.

Glycerin acts as a humectant, delaying drying out. Borax increases cross linking of starch gel, and thus material stability. Salt contributes to antimicrobial property. Canola is a low acid oil that reduces stickiness without damaging starch gel stability. Glycerin, borax, salt and canola are each optional, and may be used in any combination independent of each other.

Example 13

Material of fair quality. Stability highly variable, dependent on starch used.
Wet Component:

| | |
|---|---|
| Water | 4762 g |
| Starch: any type of starch, or any combination of modified or unmodified starches (Rice, Potato, Tapioca, Corn, etc.) | 238 g |

Dry Component

| | |
|---|---|
| Starch: any type of starch, or any combination of modified or unmodified starches (Rice, Potato, Tapioca, Corn, etc.) | 5000 g |

Cook wet components if required to form gel, heating to about 100° C. depending on starch type. Stir slowly as starch begins to gel, allow to set 10 minutes and reach room temperature. Add dry component stirring gently, then knead mixture, stopping when material becomes smooth and forms a cohesive mass.

Example 14

Gel made with less starch. Material of variable quality and stability, dependent on starch used.
Wet Component:

| | |
|---|---|
| Water | 5882 g |
| Starch: any type of starch, or any combination of modified or unmodified starches (Rice, Potato, Tapioca, Corn, etc.) | 176 g |

Dry Component

| | |
|---|---|
| Starch: any type of starch, or any combination of modified or unmodified starches (Rice, Potato, Tapioca, Corn, etc.) | 3942 g |

Cook wet components if required to form gel, heating to about 100° C. depending on starch type. Stir slowly as starch begins to gel, allow to set 10 minutes and reach room temperature. Add dry component stirring gently, then knead mixture, stopping when material becomes smooth and forms a cohesive mass.

Example 15

Prepared in accordance with U.S. Pat. No. 6,713,624
Wet Component:

| | |
|---|---|
| Water | 500 g |
| Starch: Wheat flour | 400 g |
| High Amylopectin Corn Starch | 100 g |

Mixed all ingredients and heated slightly while mixing, to simulate heat generated by larger batch mixed for 5 minutes as illustrated in the Hasbro patent. All starch in the mixture gelatinized and resultant material was not significantly different in texture and material properties from any number of well known play dough materials.

Example 16

Gel made with more starch. Material of variable quality and stability, dependent on starch used.
Wet Component:

| | |
|---|---|
| Water | 4115 g |
| Starch: any type of starch, or any combination of modified or unmodified starches (Rice, Potato, Tapioca, Corn, etc.) | 412 g |

Dry Component

| | |
|---|---|
| Starch: any type of starch, or any combination of modified or unmodified starches (Rice, Potato, Tapioca, Corn, etc.) | 5473 g |

Cook wet components if required to form gel, heating to about 100° C. depending on starch type. Stir slowly as starch begins to gel, allow to set for 10 minutes and reach room temperature. Add dry component stirring gently, then knead mixture, stopping when material becomes smooth and forms a cohesive mass.

In accordance with any of the foregoing procedures, in place of creating the initial gel there may be used starch gel, and this is commonly known to persons skilled in the art, which may be made using "cold water swelling (CWS)" or "cook up" starch. CWS starch does not require heating to form a gel with water, cook up starch does require heating. Heating temperature and duration required to gel "cook up" starches in water varies by type of starch, and may be affected by other additives such as salt.

The invention claimed is:

1. A process for the formation of a shear thickening dilatant fluid, comprising the steps of:
   obtaining a quantity of starch gel;
   adding dry starch to said starch gel to form a starch mixture;
   stirring said starch mixture until mixed;
   kneading said mixed starch mixture into a smooth pliable cohesive mass;
   whereby said smooth pliable cohesive mass comprises a shear thickening dilatant fluid suited to being molded and more stable than said starch gel.

2. The process of claim 1 wherein said step of obtaining a quantity of starch gel comprises mixing uncooked starch and water, heating to boiling and cooling to ambient temperature.

3. The process of claim 1 wherein said step of obtaining a quantity of starch gel comprises mixing cold water swelling starch with water.

4. The process of claim 2 wherein the uncooked starch is corn starch.

5. The process of claim 4 wherein the corn starch comprises amylopectin.

6. The process of claim 5 where said corn starch comprises at least 90% by weight of amylopectin.

7. The process of claim 1 wherein said step of obtaining a quantity of starch gel comprises adding 100 parts by weight of gel to within a range of from 150 parts by weight of dry uncooked starch.

8. The process of claim 7 wherein said step of obtaining a quantity of starch gel comprises utilizing a portion of starch gel containing about 5 to about 10 parts by weight of starch in 100 parts by weight of water and adding to each 100 parts by weight of gel from about 67 to about 133 parts by weight of dry starch.

9. The process of claim 1, wherein said step of obtaining a quantity of starch gel comprises mixing within a range of from 10 to 15 parts by weight of starch in 100 parts by weight of water to form a mixture and adding to each 100 parts by weight of mixture an amount within a range of from 60 to 80 parts by weight of dry uncooked starch.

10. The process of claim 1 additionally comprising providing, as an additive material, at least one member selected from the group consisting of a humectant, a lipid, a non-toxic salt, and borax.

11. The process of claim 10 wherein said additive material comprises up to about 15% by weight of the entire dilatant material formed in said process.

12. The process of claim 10 wherein said additive material at least comprises a salt of a strong acid.

13. The process of claim 10 wherein the said additive material at least comprises borax.

14. The process of claim 10 wherein the said additive material at least comprises a lipid.

15. The process of claim 14 wherein the said lipid is a low acid oil.

16. The process of claim 15 wherein the oil is canola oil.

17. The process of claim 10 wherein the humectant is glycerin.

18. The process of claim 12 wherein the salt is sodium chloride.

* * * * *